Aug. 2, 1938.  E. W. WORK  2,125,662
RADIATOR AIR VALVE
Filed Oct. 21, 1935
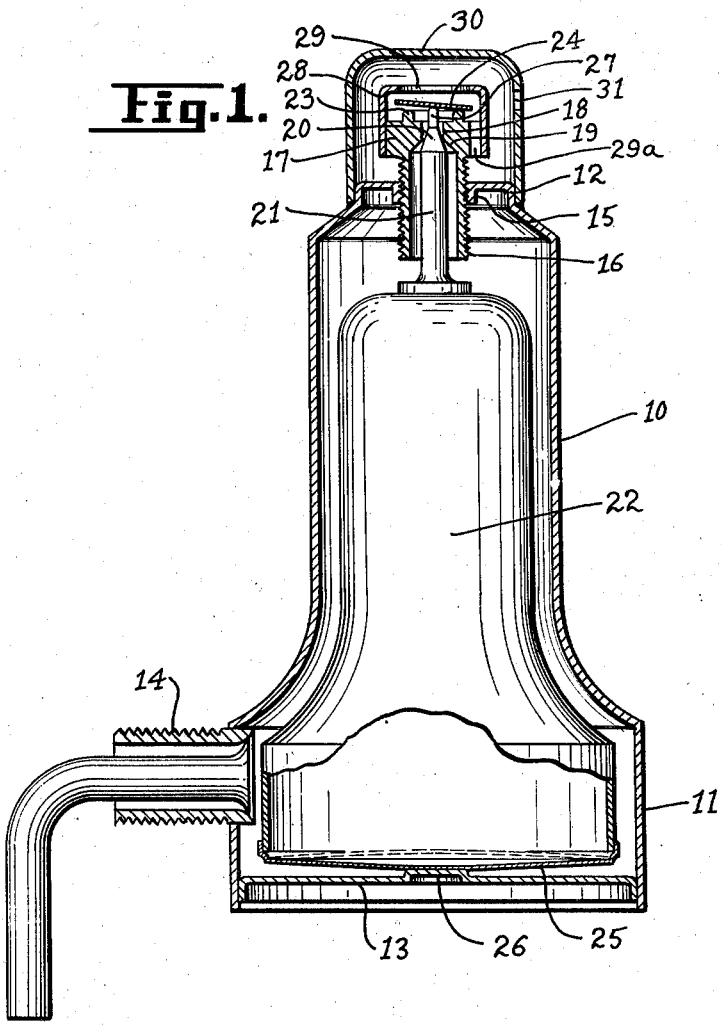
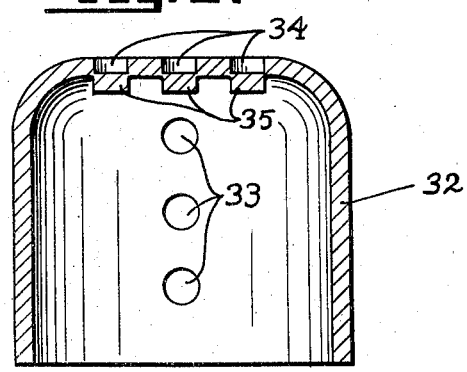
INVENTOR
*Ernest W. Work*
BY
*H. G. Manning*
ATTORNEY Patented Aug. 2, 1938

2,125,662

UNITED STATES PATENT OFFICE 2,125,662

RADIATOR AIR VALVE

Ernest W. Work, Toronto, Ontario, Canada, assignor to The Beaton & Cadwell Manufacturing Company, New Britain, Conn., a corporation of Connecticut Application October 21, 1935, Serial No. 45,999

1 Claim. (Cl. 236—63)

This invention relates to radiator valves, and more particularly to an automatic air-relief valve for use on steam-heating radiators.

One object of this invention is to provide an air relief valve of the above nature which is adapted to perform three functions: (a) permitting the escape of entrapped air from a steam radiator, (b) preventing the escape of steam and water and (c) preventing atmospheric air from entering the radiator.

A further object is to provide a radiator valve of the above nature in which the three functions enumerated above are accomplished by a small gravity-operated check valve and a float valve having a single flexible diaphragm adapted to expand for closing the main valve when heated by steam or vapor, or when a vacuum occurs in the system.

A further object is to provide an automatic air relief valve of the above nature in which the main valve is provided with a needle having an extension adapted to unseat the check valve whenever the main valve is closed, thus preventing said check valve from sticking to its seat.

A further object is to provide a radiator valve of the above nature in which the main valve seat is adjustable so as to permit the accurate "setting" of said valve seat in the casing.

A further object is to provide a radiator valve of the above nature which will be simple in construction, inexpensive to manufacture, easy to install and manipulate, compact, ornamental in appearance, and very efficient and durable in use.

With these and other objects in view, there have been illustrated on the accompanying drawing two forms in which the invention may be conveniently embodied in practice.

In the drawing:

Fig. 1 represents a vertical sectional view of a radiator valve embodying the invention.

Fig. 2 is a vertical sectional view of a modified form of cap member adapted to be employed on the top of the valve.

Referring now to the drawing in which like reference numerals denote corresponding parts throughout the several views, the numeral 10 indicates an elongated casing having an enlarged lower end 11, and a reduced upper neck section 12. The enlarged lower end 11 is closed by means of an inverted shallow cupped disc 13 inserted a slight distance into said end 11 and made hermetically tight in any suitable manner, as by soldering. The casing 10 is adapted to be secured to a radiator, not shown, of a steam-heating system by means of a horizontal threaded nipple 14 secured, as by soldering, in the enlarged lower end 11 of the casing 10.

The neck 12 of the casing is provided at its upper end with an inwardly drifted depending tapped flange 15 adapted to receive a threaded adjustable tubular vent member 16 formed with an enlarged integral head 17 at its upper end. The head 17 is provided with a central restricted vertical passage 18 having two opposed valve seats, the lower of which is tapered at 19 for engagement by the conical upper end 20 of a needle 21 formed on the upper end of a main hollow float 22. The head 17 is provided on its upper face with an upstanding annular rib 23 of rounded cross-section and adapted to be closed by a loose auxiliary check valve plate 24, preferably of light weight, which rests thereon by gravity.

The hollow float 22 is enlarged at its base to conform to the interior shape of the casing 10, and has its lower end hermetically sealed by means of a relatively large flexible diaphragm 25. The diaphragm 25 is adapted to rest upon an upwardly extending abutment 26 formed integral with the inverted closing disc 13 of the base of the casing 10. The float 22 is charged with a quantity of suitable volatile fluid, such as alcohol, sufficient to cause said diaphragm 25 to flex outwardly to the full-line position shown in Fig. 1 when said float is heated by steam. This will cause the float to move upwardly for tightly closing the main valve. The needle 21 is provided on its upper end with a reduced pin 27 which is adapted to engage the auxiliary check valve plate 24 and hold it in the raised open position shown in Fig. 1 as long as the main valve remains closed.

The auxiliary check valve is adapted to be loosely confined within an inverted cup-shaped shell 28 tightly fitted upon the enlarged head 17 of the valve member 16. In order to permit the escape of air from the shell 28, the dome portion of said shell 28 is provided with a relatively large central aperture 29, and the head 17 is provided on one side with a vertical aperture 29a.

The upper section of the valve structure is protected by an exterior inverted tubular cap 30 adapted to be detachably secured upon the neck end 12 of the body 10, as by a friction fit. The cap 30 is provided in one side with an air vent aperture 31.

Operation

In the operation of the valve, assuming that the radiator to which it is connected through the nipple 14 contains cold air, it will be understood that before any steam or vapor from the heating system enters the valve, the diaphragm 25 of the float will be deflected upwardly, as shown in dotted lines in Fig. 1. The main tapered valve seat 19 will at this time be open, and the check valve plate 24 will be closed. When the pressure in the radiator is raised above that of the atmosphere, either by opening the steam valve or by generating pressure at the boiler, the auxiliary check valve disc 24 will be raised by the force of the escaping air which is permitted to pass readily out through the vent 31 in the cap 30. When the evacuation of the air is complete, hot steam or vapor will surround the float 22, causing the interior volatile substance to expand and flex the diaphragm 25 downwardly with a snap action and force the needle 21 to engage tightly on the conical seat 19, thus preventing the escape of steam from the heating system, and incidentally unseating the auxiliary check valve 24.

If for any reason the quantity of steam admitted to the radiator is insufficient to completely satisfy the condensation capacity thereof, the steam pressure within the radiator will fall and a partial vacuum will be created therein. This condition will not, however, cause the float 22 to fall, but the main valve will remain closed due to the fact that the greater pressure of the vapor within said float will continue to hold the diaphragm 25 flexed and bulged outwardly.

It will be seen that the construction of the valve is such that the greater the vacuum in the system, the tighter will the main valve be closed, and said valve will remain closed even if the valve should cool off completely. When, however, the vacuum is destroyed and the radiator cools off, the float 22 will fall by gravity and open the main valve, whereupon the auxiliary check valve 24 will drop upon its seat.

One advantage of the present invention is that the check valve 24 will never be forced upon its seat with high pressure, because before such a pressure can develop, the vacuum within the valve will cause the main valve to close tightly upon its seat, and cause the auxiliary check valve to be unseated. The check valve will thus be prevented from any possibility of sticking to its seat under any conditions to which it is likely to be subjected.

Fig. 2 illustrates a modified form of protecting cap 32 having a row of lateral air vent apertures 33. The top dome section of the cap 32 is provided with a plurality of partially pierced apertures 34, leaving struck-in plugs 35 on the inside of the cap 32, each plug being connected to the cap 32 by a relatively thin connecting ring of stock. By means of this construction, if additional air vent apertures are needed, they may be readily provided by merely punching one or more of the plugs 35 inwardly by means of a nail, awl or other sharp pointed tool.

It is to be noted that the flexible diaphragm at the base of the float is purposely made considerably larger in area than the diaphragm commonly used on radiator air valve floats, and that the volatile fluid which it contains is designed to create sufficient pressure to bulge the diaphragm outwardly, not only when the float is heated, but also when a vacuum occurs within the system. The present invention is the first radiator air valve in which the single diaphragm of the float is utilized to accomplish the two functions of closing the main valve when the float is surrounded by steam, and also when surrounded by a vacuum.

It will also be understood that if a vacuum should be created before any heat has reached the valve, the auxiliary valve plate 24 would prevent atmospheric air from entering the system. If the vacuum should be increased, the diaphragm would bulge outwardly, and the main valve would close and unseat the auxiliary valve.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a steam radiator valve, a casing having a hollow expansible vent aperture in its upper part, a hollow expansible float member located in said casing and having a needle valve at its upper end for closing said vent aperture, said float member having a flexible diaphragm on its base supported by said casing, an auxiliary check valve adapted to close the exterior of said vent aperture and exclude air when said needle valve is depressed from its seat, and a reduced elongated rod extending upwardly from said needle valve to hold said auxiliary valve upwardly from its seat and prevent it from sticking whenever said float is held in its upper valve closing position by the downward flexing of said diaphragm under the action of excessive temperature or vacuum conditions.

ERNEST W. WORK.